March 21, 1950     F. M. CHRISTIAN     2,501,315
AIRPLANE MOTOR
Filed Feb. 9, 1948     4 Sheets-Sheet 1
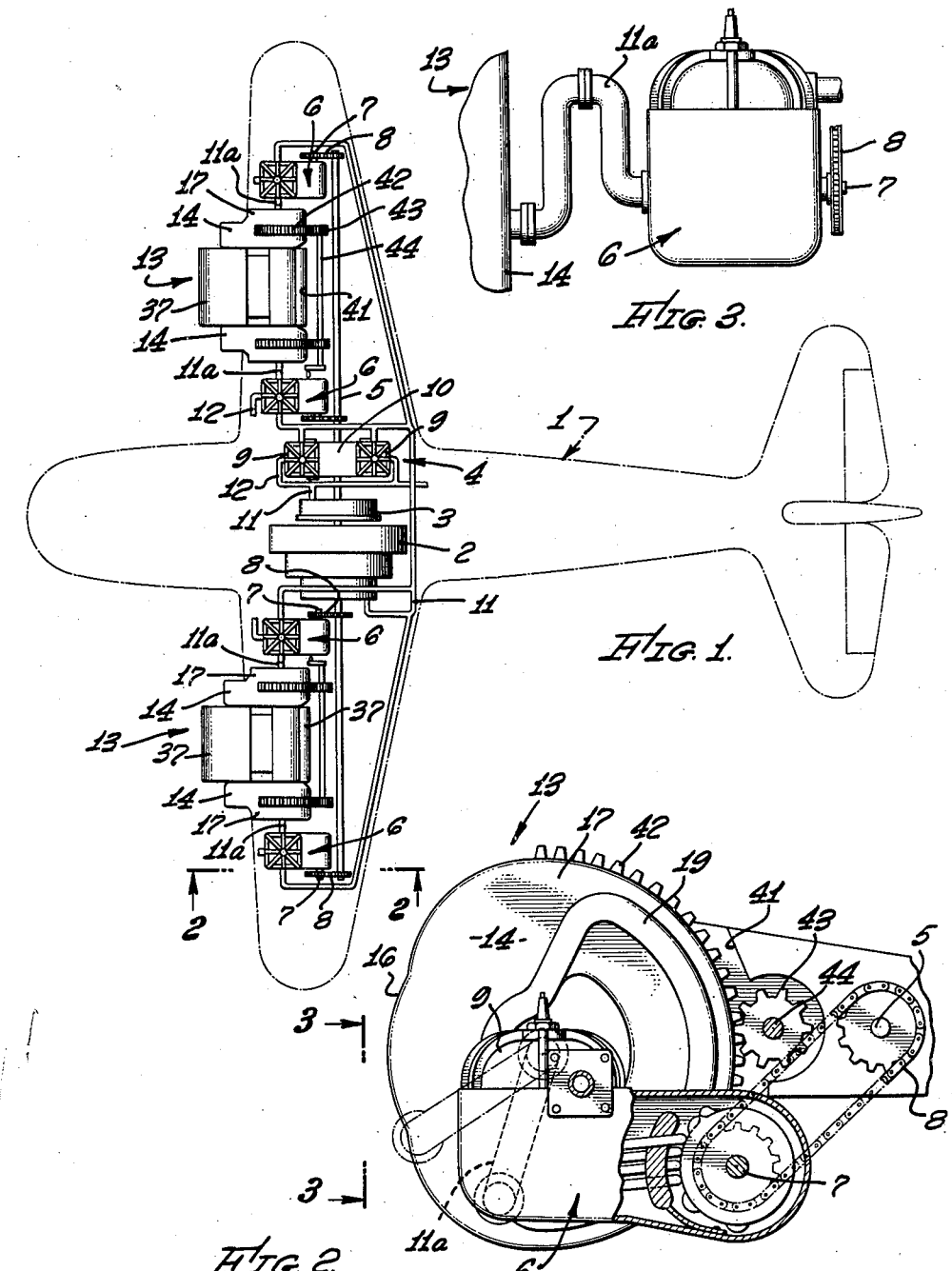
INVENTOR.
FRANK M. CHRISTIAN,
BY Lyon & Lyon
ATTORNEYS.

March 21, 1950     F. M. CHRISTIAN     2,501,315
AIRPLANE MOTOR
Filed Feb. 9, 1948     4 Sheets-Sheet 2
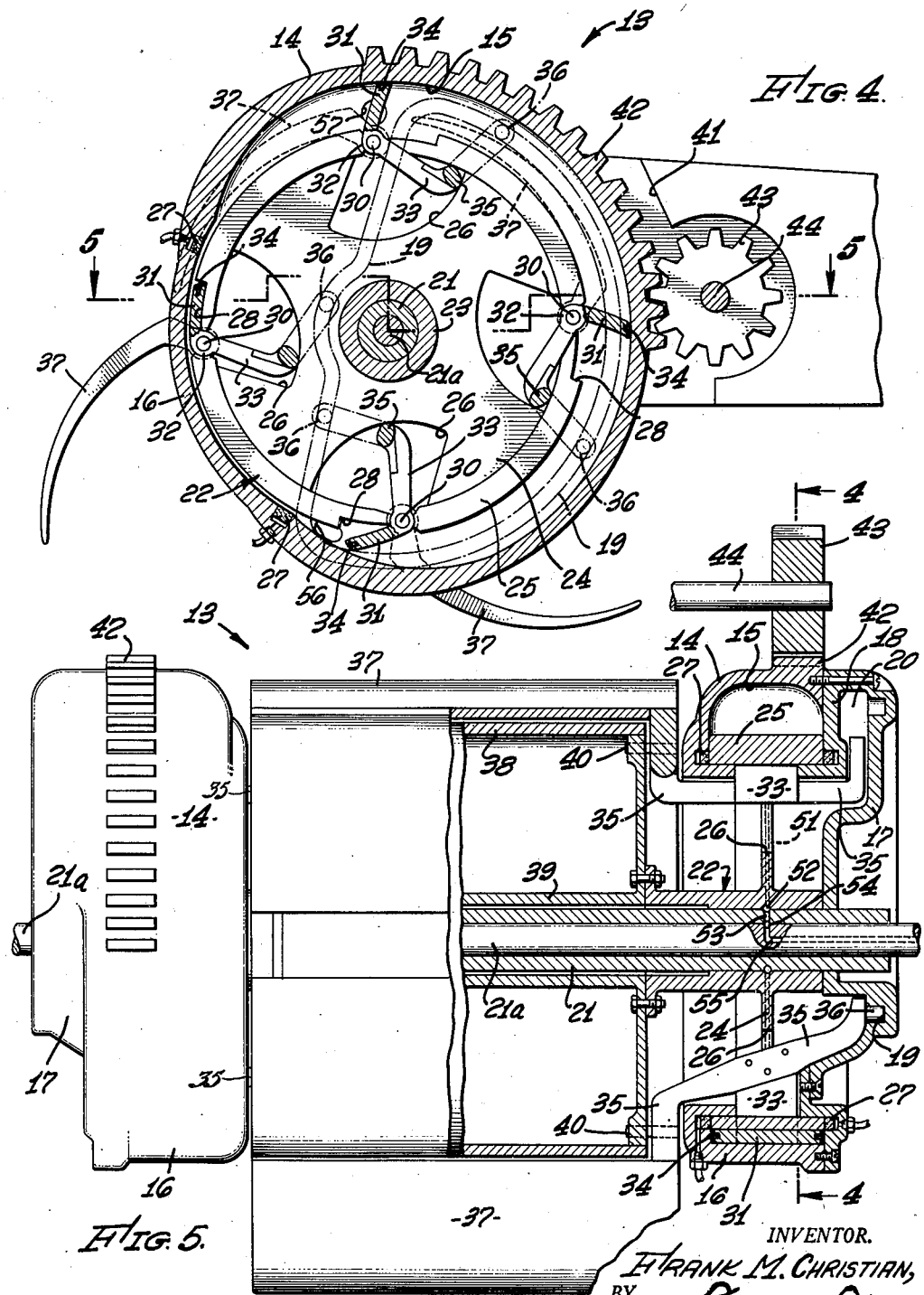
INVENTOR.
FRANK M. CHRISTIAN,
BY Lyon & Lyon
ATTORNEYS.

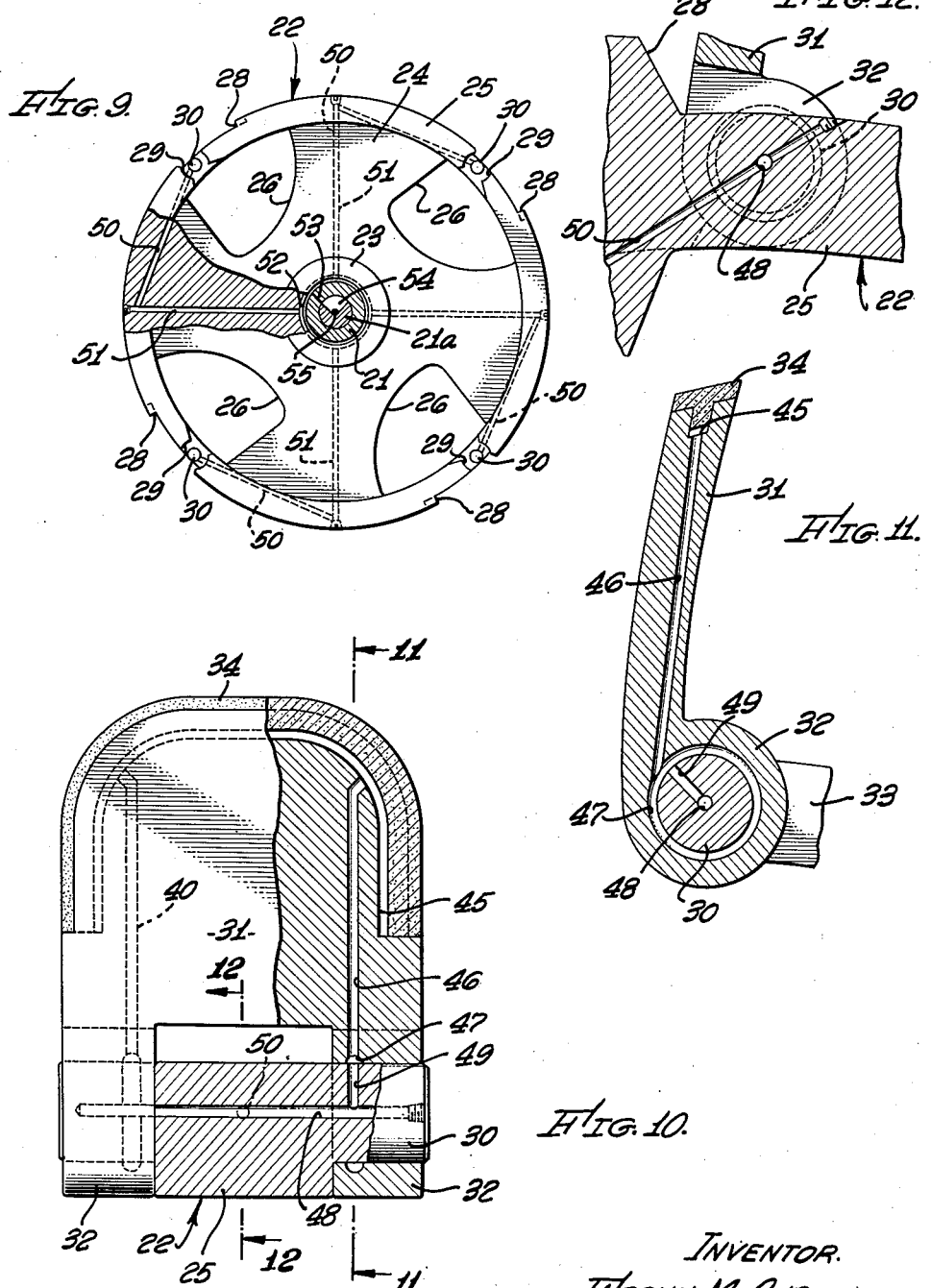

Patented Mar. 21, 1950

2,501,315

UNITED STATES PATENT OFFICE 2,501,315

AIRPLANE MOTOR

Frank M. Christian, Ventura, Calif.

Application February 9, 1948, Serial No. 7,242

12 Claims. (Cl. 244—9)

My invention relates to airplane motors, and included in the objects of my invention are:

First, to provide an airplane motor which employs air scoops or vanes rotated about an axis approximately parallel to the leading edge of the airplane wing and tiltable about the planetary axes between radially extended and retracted positions to impel the air rearwardly and upwardly against the underside of the wing, not only to propel the aircraft forwardly but also to aid in the lift thereof.

Second, to provide an airplane motor which incorporates a tilting blade type of power unit and novelly arranged propelling elements directly coupled to the tiltable blades.

Third, to provide an airplane motor which may be supplied with pressure fluid from a power plant of the type disclosed in my copending application Serial No. 791,440, filed December 12, 1947.

Fourth, to provide an airplane motor which is particularly simple and economical of construction and operation and adapted to produce a maximum amount of thrust without necessitating high operational speeds, thereby not only reducing noise but also excessive wear and vibration.

With the above and other objects in view as may appear hereinafter, reference is directed to the accompanying drawings in which:

Figure 1 is a diagrammatical plan view of my airplane motor and associated power plant shown in its relation to an airplane.

Figure 2 is an enlarged fragmentary sectional view through 2—2 of Figure 1.

Figure 3 is a view taken from the line 3—3 of Figure 2 showing the coupling between the airplane motor and its source of pressure fluid.

Figure 4 is an enlarged fragmentary sectional view through 4—4 of Figure 5, the motor being shown in its position for high forward speed.

Figure 5 is a partial elevational view, the section being taken through 5—5 of Figure 4.

Figure 9 is a side elevational view of the rotor structure, shown mounted on its sleeve and shaft, the sleeve and shaft and a portion of the rotor being shown in section.

Figure 10 is an enlarged partial sectional, partial elevational view of a drive blade and adjacent mounting portion of the rotor.

Figure 11 is a fragmentary sectional view through 11—11 of Figure 10.

Figure 12 is a fragmentary sectional view through 12—12 of Figure 10.

Figure 6:
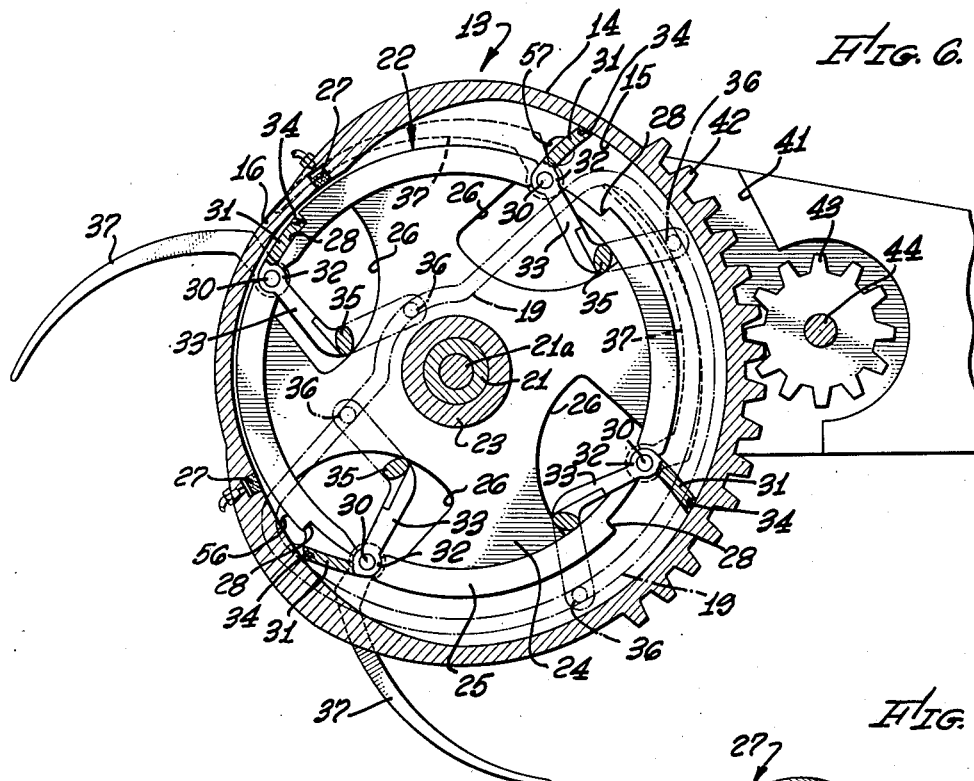
Figure 6 is a sectional view similar to Figure 4 showing the airplane motor in its position for high lift.
Figures 7, 8:
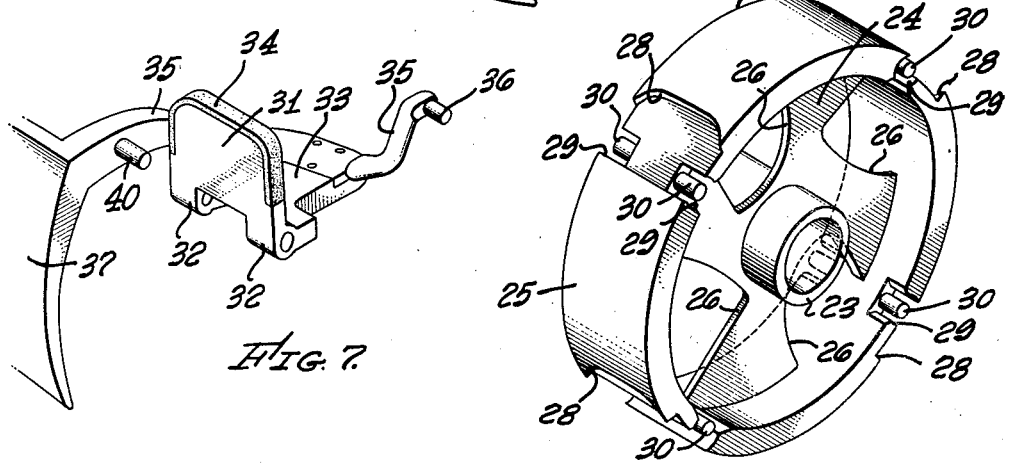
Figure 7 is a fragmentary perspective view showing a driving blade and associated air vane and their connections to a common tilting means.
Figure 8 is a perspective view of a rotor employed in one of the engine units.

Reference is first directed to Figure 1. In this figure there is illustrated by broken outline a plan view of an airplane. Within the fuselage of the airplane is mounted a compressor 2 which is driven by a motor 3 supplied with pressure fluid from a power unit 4. A cam shaft 5 controls the power unit 4 and is also employed to control propelling engine power units 6 mounted in each wing, the cam shaft 5 being connected to the cam shafts 7 of said propelling engine power units by means of chain drives 8.

The compressor driving motor and the power units are more fully described in my copending application Serial No. 791,440, filed December 12, 1947. In said application the power unit 4 is disclosed as comprising a pair of combustion chambers 9 mounted at the extremities of a cam shaft housing 10. A series of cams and control levers actuate the valve elements, ignition means and fuel supply to the combustion chambers.

In the present instance, the propelling engine power units 6 are identical to the power unit disclosed in my copending application except that a single combustion chamber is employed. Air from the compressor 2 is supplied through a piping system to each combustion chamber 9 of the power units 4 and 6. The power units are designed to mix fuel with the air and burn the same to produce increased quantities of fluid under pressure which, in the case of the power unit 4, is fed through line 11 to the drive motor 3. This motor as shown in my previous application is a sliding vane type of motor and its shaft which connects with the compressor 2 is common to, or a part of, the cam shaft 5. The several combustion chambers are provided with suitable exhaust lines 12 to discharge scavenging air and excess pressure fluid.

The power units 6 are connected by their discharge lines 11ª to engine units 13 mounted in the wings of the airplane. In the present instance, a pair of power units 6 is mounted in each wing and located between them is a pair of engine units 13, one adjacent each power unit. The pair of engine units thus provided are spaced from each other and mounted on a common axis.

Each engine unit includes an annular shell or housing 14, the interior of which defines an arcuate working chamber 15 interrupted by a sealing section 16. The side of the shell adjacent the power unit 6 is covered by a side housing 17 having internal flange 18 which closes the side of the working chamber 15. The side housing 17 is provided with a cam track 19. A portion of the cam track confronts the internal flange 18 but is spaced therefrom by a pocket 20.

The side housing 17 of each pair of engine units is secured to a common sleeve 21 in which is fitted a fixed shaft 21a. The extremities of the fixed shaft are supported by suitable brackets (not shown).

Journaled on the sleeve 21 within each shell 14 and side housing 17 is a rotor 22. Each rotor comprises a hub 23, a radiating web 24 and a rim 25. The web is provided with openings 26 for control levers to be described hereinafter. The rim of the rotor forms the radially inner wall of the working chamber 15 and confronts the sealing section 16. Suitable sealing rings 27 are provided in the shell 14 for engagement with the axial extremities of the rim 25.

The rim of the rotor 22 is provided with a series of equally spaced recesses 28 which are intersected by notches 29 cut into the axial sides of the rim 25. Journal pins 30 extend axially into the notches 29. Each recess 28 receives a drive blade 31. Each drive blade is provided with spaced bearing portions 32 which fit the journal pins 30. A bracket arm 33 extends from each drive blade into a corresponding opening 26 provided in the web 24.

Each drive blade 31 is adapted to tilt between an extended position in which it conforms to the walls of the working chamber 15 and a retracted position within the recess 28. Each drive blade is provided with a peripheral sealing strip 34 to be described in more detail hereinafter.

The radially inner end of each bracket 33 is attached to a control lever 35 which extends axially through the web 24 of the rotor. One extremity of each control lever 35 is provided with a cam follower 36 which rides in the cam track 19. The other extremity of the control lever protrudes axially beyond the engine unit for connection to an air vane or air scoop 37. Each end of each air scoop is thus equipped with a control lever.

The air vanes 37 are mounted on a drum 38 which is provided with a central tube 39 surrounding the sleeve 21 and secured to the hubs 23 of the pair of rotors 22 of the pair of engine units. Each air vane is mounted on a pair of journal pins 40 which are coaxially disposed with respect to the tilting axes of the corresponding drive blades 31. By this means the air vanes are caused to oscillate between retracted positions conforming to the periphery of the drum 38 and extended positions.

The pair of engine units and the set of air vanes mounted therebeteween are fitted into recesses 41 provided in the leading edge of the airplane wing. The shell 14 of each engine unit 13 is provided with a segmental gear 42 which is engaged by a pinion gear 43 mounted on a countershaft 44.

The sealing strip 34 fitted on each drive blade 31 is T-shaped in cross section and the leg of the T fits within a channel 45 formed in the periphery of the drive blade as shown best in Figures 10 and 11. The sealing strips are lubricated and urged into sealing contact by means of pressure fluid introduced through passages 46 provided in each drive blade. The passages 46 communicate with channels 47 provided in the bearing portions 32.

The rotor 22 is provided with cross passages 48 extending into the journal pins or lugs 30, which connect with radial passages 49 directed into the channels 47. The cross passages 48 are supplied by passages having tangentially disposed legs 50 and radial legs 51, the inner ends of the latter communicating with a common channel 52 provided with the hub 23 as shown best in Figures 5 and 9.

The channel 52 communicates with a port 53 in the sleeve 21 which in turn communicates with a slot 54 in the fixed shaft 21a.

The slot 54 connects with an axial passage 55 extending to an extremity of the shaft 21a where it is connected to a source of lubricant fluid, not shown.

Operation of my airplane motor is as follows: Pressure fluid produced in a manner such as described in my copending application is introduced into intake openings 56 provided in the starting end of each working chamber 15. Exhaust fluid is discharged through exhaust 57 at the closing end of each working chamber. The cam track 19 is so arranged that, as each drive blade moves into the working chamber; that is, moves in a counterclockwise direction as viewed in Figures 4 and 6, the blade is tilted to its extended position so as to form a moving wall of the working chamber. As each drive blade reaches the closing end of the working chamber, the cam track operating through the control lever 35 tilts the drive blade to its retracted position for movement across the sealing section 16.

The air vanes are moved in unison with the drive blades but the arrangement of the control levers is such that the air vanes are extended as they move downwardly across the leading edge of the wing and rearwardly thereunder. The air vanes are caused to move to their retracted position as to approach the wing and maintain this position until they have cleared the upper end thereof. By adjusting the position of the engine units 13 through rotation of the control shaft 44, the position in its rotation at which each air vane is extended or retracted may be varied. In the extreme position shown in Figure 4, the maximum rearward and sustaining thrust is obtained from each air vane, and in particular it should be noted that each air vane closes immediately before traversing the airplane wing so that air which may be pocketed therein is forcibly ejected upwardly and rearwardly against the airplane wing to increase its lift. In an intermediate position, such as shown in Figure 6, the air scoops open as they move downwardly and produce maximum lift. The rearward thrust, however, is reduced. In the opposite extreme position of the engine units from that shown in Figure 4 the air scoops may open early enough in their cycle of movement to exert a forward thrust so as to produce a braking effect.

Having fully described my invention, it is to be understood that I do not wish to be limited to the details herein set forth, but my invention is of the full scope of the appended claims.

I claim:

1. An airplane propulsion device comprising: a pair of rotatable and tilting blade drive units disposed in spaced relation about a common axis; a set of air vanes disposed between said drive units and connected with corresponding blades of said drive units to rotate and tilt therewith.

2. An airplane propulsion device comprising: a pair of drive units each including a rotor, a stator, a plurality of drive blades carried by said rotor and means for tilting said blades during rotation; a common shaft for said drive units; a drum mounted on said shaft between said drive units and rotatable with said rotors; and a plurality of vanes pivotally mounted on said drum and movable between a radially retracted and a radially extended position, said vanes being operatively connected with said blade tilting means.

3. An airplane propulsion device comprising: a rotatable drum; a plurality of air vanes pivotally mounted thereon about axes parallel to the axis of said drum and movable between a radially retracted and a radially extended position; a drive unit for said drum and vanes including a stator defining an internal arcuate working chamber and a partition separating the extremities of said chamber, a rotor mounted in said stator and connected with said drum, a plurality of blades pivotally mounted on axes coinciding with corresponding axes of said air vanes and located in the periphery of said rotor, said vanes movable between a radially retracted position when passing said partition and an extended position when passing in said work chamber; tilting means common to said vanes and blades; and means for supplying a pressure fluid to said work chamber and exhausting said pressure fluid therefrom.

4. An airplane propulsion device adapted for installation at the leading edge of an airplane wing and comprising: a pair of drive units mounted in spaced relation to each other on a common axis disposed substantially parallel to the leading edge of an airplane wing; a series of air vanes tiltably mounted between said drive units about axes planetary to said common axis, said air vanes being driven about said common axis by said drive units; and lever and cam means for controlling tilting movement of said air vanes to cause each of said air vanes to extend radially during a portion of its rotation about said common axis and to retract during a complementary portion of said rotation.

5. An airplane propulsion device adapted for installation at the leading edge of an airplane wing and comprising: a pair of drive units mounted in spaced relation to each other on a common axis disposed substantially parallel to the leading edge of an airplane wing; a series of air vanes tiltably mounted between said drive units about axes planetary to said common axis, said air vanes being driven about said common axis by said drive units; lever and cam means for controlling tilting movement of said air vanes to cause each of said air vanes to extend radially during a portion of its rotation about said common axis and to retract during a complementary portion of said rotation; and means for moving said cam means to alter the locations at which said air vanes shift between their retracted and extended positions.

6. An airplane propulsion device, comprising: a set of air vanes; sets of drive blades disposed at opposite ends of said sets of air vanes; means defining a common central axis of rotation for said sets of air vanes and drive blades; other means defining planetary axes on which said air vanes are mounted coaxially with said drive blades; cam and lever means common to said drive blades and air vanes for tilting the same about said planetary axes between radially retracted and radially extended positions; housing means encompassing said sets of drive blades and defining work chambers in which said drive blades move; and means for supplying pressure fluid to said work chambers and exhausting said fluid therefor, said work chambers and drive blades cooperating to cause rotation of said drive blades and air vanes about said central axis.

7. An airplane propulsion device, comprising: a set of air vanes; sets of drive blades disposed at opposite ends of said sets of air vanes; means defining a common central axis of rotation for said sets of air vanes and drive blades; other means defining planetary axes on which said air vanes are mounted coaxially with said drive blades; cam and lever means common to said drive blades and air vanes for tilting the same about said planetary axes between radially retracted and radially extended positions; housing means encompassing said sets of drive blades and defining work chambers in which said drive blades move; means for supplying pressure fluid to said work chambers and exhausting said fluid therefor, said work chambers and drive blades cooperating to cause rotation of said drive blades and air vanes about said central axis; and means for moving said housing and cam means about said central axis to alter the locations at which said air vanes and drive blades move about their planetary axes.

8. An airplane propulsion device, comprising: a circular housing; a rotor therein, said housing and rotor defining an arcuate work chamber, said rotor sealingly engaging said housing between the extremities of said work chamber; means for introducing into and exhausting from said work chamber pressure fluid; a plurality of drive blades tiltable about planetary axes in the periphery of said rotor and movable between a retracted position within the periphery of said rotor and an extended position to form moving walls in said work chamber; means for extending and retracting said drive blades; a plurality of air vanes mounted externally of said housing for rotation about the axis of said rotor, said air vanes being tiltable about planetary axes coinciding with the planetary axes of said drive blades; and means operatively connecting corresponding air vanes and drive blades for simultaneous tilting movement.

9. An airplane propulsion device, comprising: a circular housing; a rotor therein, said housing and rotor defining an arcuate work chamber, said rotor sealingly engaging said housing between the extremities of said work chamber; means for introducing into and exhausting from said work chamber pressure fluid; a plurality of drive blades tiltable about planetary axes in the periphery of said rotor and movable between a retracted position within the periphery of said rotor and an extended position to form moving walls in said work chamber; means for extending and retracting said drive blades; a plurality of air vanes mounted externally of said housing for rotation about the axis of said rotor, said air vanes being tiltable about planetary axes coinciding with the planetary axes of said drive blades; a tilting cam means carried by said housing; a cam follower; and levers common to corresponding air vanes and drive blades and connected with said tilting cams to effect simultaneous tilting movement of said air vanes and their corresponding drive blades.

10. An airplane propulsion device, comprising: a circular housing; a rotor therein, said housing and rotor defining an arcuate work chamber, said rotor sealingly engaging said housing between the extremities of said work chamber; means for introducing into and exhausting from said work chamber pressure fluid; a plurality of drive blades tiltable about planetary axes in the periphery of said rotor and movable between a retracted position within the periphery of said rotor and an extended position to form moving walls in said work chamber; means for extending and retracting said drive blades; a plurality of air vanes mounted externally of said housing for rotation about the axis of said rotor, said air vanes being tiltable about planetary axes coinciding with the planetary axes of said drive blades; a tilting cam means carried by said housing; a cam follower; levers common to corresponding air vanes and drive blades and connected with said tilting cams to effect simultaneous tilting movement of said air vanes and their corresponding drive blades; and means for turning said housing and cam means about the axis of said rotor to vary the locations at which said air vanes and drive blades move between their extended and retracted positions.

11. An airplane propulsion device for aircraft, comprising: a rotatable drum structure adapted to be set into the leading edge of an airplane wing and rotatable about an axis normal to the direction of movement of the wing in flight; means for rotating said drum, said means involving a pair of tilting blade-type pressure fluid motors; a plurality of air scoops rotatable with said drum and tiltable about axes planetary to the axis of said drums; and means common to the blades of said motor for tilting said air scoops to move them between radially extended and radially retracted positions, said means operable to extend said air scoops as they move downwardly and rearwardly and to retract said air scoops as they traverse the airplane wing.

12. An airplane propulsion device for aircraft, comprising: a rotatable drum structure adapted to be set into the leading edge of an airplane wing and rotatable about an axis normal to the direction of movement of the wing in flight; a pair of tilting blade-type pressure fluid motors for rotating said drum; a plurality of air scoops rotatable with said drum and tiltable about axes planetary to the axis of said drum; means common to the blades of said fluid motors for tilting said air scoops to move them between radially extended and radially retracted positions, said means operable to extend said air scoops as they move downwardly and rearwardly and to retract said air scoops as they pass traverse the airplane wing; and apparatus operable to shift the position of said tilting means about the axis of said drum.

FRANK M. CHRISTIAN.

REFERENCES CITED

The following references are of record in the file of this patent:

UNITED STATES PATENTS

| Number | Name | Date |
|---|---|---|
| 265,332 | Lojda | Oct. 3, 1882 |
| 1,138,481 | Hupe | May 4, 1915 |
| 2,050,903 | Topliff | Aug. 11, 1936 |
| 2,397,189 | Main | Mar. 26, 1946 |
| 2,413,460 | Main | Dec. 31, 1946 |
| 2,436,113 | Main | Feb. 17, 1948 |

FOREIGN PATENTS

| Number | Country | Date |
|---|---|---|
| 5,164 | Great Britain | 1910 |